(12) United States Patent
Johnston et al.

(10) Patent No.: US 10,958,681 B2
(45) Date of Patent: Mar. 23, 2021

(54) NETWORK SECURITY INDICATOR OF COMPROMISE BASED ON HUMAN CONTROL CLASSIFICATIONS

(71) Applicant: Cisco Technology, Inc., San Jose, CA (US)

(72) Inventors: Jay Kemper Johnston, Raleigh, NC (US); David C. White, Jr., St. Petersburg, FL (US); Magnus Mortensen, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 259 days.

(21) Appl. No.: 15/933,923

(22) Filed: Mar. 23, 2018

(65) Prior Publication Data
US 2019/0297108 A1  Sep. 26, 2019

(51) Int. Cl.
*G06N 3/08* (2006.01)
*H04L 29/06* (2006.01)

(52) U.S. Cl.
CPC .......... *H04L 63/1441* (2013.01); *G06N 3/08* (2013.01); *H04L 63/10* (2013.01); *H04L 63/145* (2013.01); *H04L 63/1458* (2013.01); *H04L 63/20* (2013.01)

(58) Field of Classification Search
CPC ... H04L 63/1441; H04L 63/145; H04L 63/10; H04L 63/20; H04L 63/1458; G06N 3/08
See application file for complete search history.

(56) References Cited

U.S. PATENT DOCUMENTS

| | | | |
|---|---|---|---|
| 6,639,900 B1 | 10/2003 | Anstey et al. | |
| 9,800,470 B2 | 10/2017 | Agarwal et al. | |
| 9,838,410 B2 * | 12/2017 | Muddu ................ | G06F 3/0484 |
| 2012/0240185 A1 * | 9/2012 | Kapoor .............. | H04L 41/0866 726/1 |
| 2014/0075004 A1 * | 3/2014 | Van Dusen ....... | G06F 16/90335 709/223 |
| 2016/0191348 A1 * | 6/2016 | Lee ........................ | H04L 43/028 709/224 |
| 2016/0330219 A1 * | 11/2016 | Hasan .................... | G06N 5/025 |
| 2018/0027006 A1 * | 1/2018 | Zimmermann ........... | G06F 9/46 726/11 |
| 2018/0241764 A1 * | 8/2018 | Nadolski .............. | G06N 3/0481 |

* cited by examiner

*Primary Examiner* — Lynn D Feild
*Assistant Examiner* — Vladimir I Gavrilenko
(74) *Attorney, Agent, or Firm* — Behmke Innovation Group LLC; Kenneth J. Heywood; Jonathon P. Western

(57) ABSTRACT

In one embodiment, a service classifies a device in a network as human-controlled or self-controlled. The service also classifies an online resource as designed for access by human-controlled devices or by self-controlled devices. The service obtains traffic data regarding an attempt by the device to access the online resource via the network. The service determines that the attempt by the device to access the online resource is a security violation, based on the classifications of the device and the online resource. The service initiates a mitigation action in the network for the security violation.

18 Claims, 10 Drawing Sheets

NETWORK SECURITY INDICATOR OF COMPROMISE BASED ON HUMAN CONTROL CLASSIFICATIONS

TECHNICAL FIELD

The present disclosure relates generally to computer networks, and, more particularly, to a network security indicator of compromise based on human-control or self-control classifications.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic includes network traffic that propagates the malware itself and network traffic that passes control commands to already infected devices. However, many instances of malware now also use encryption, to conceal their network activity from detection.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
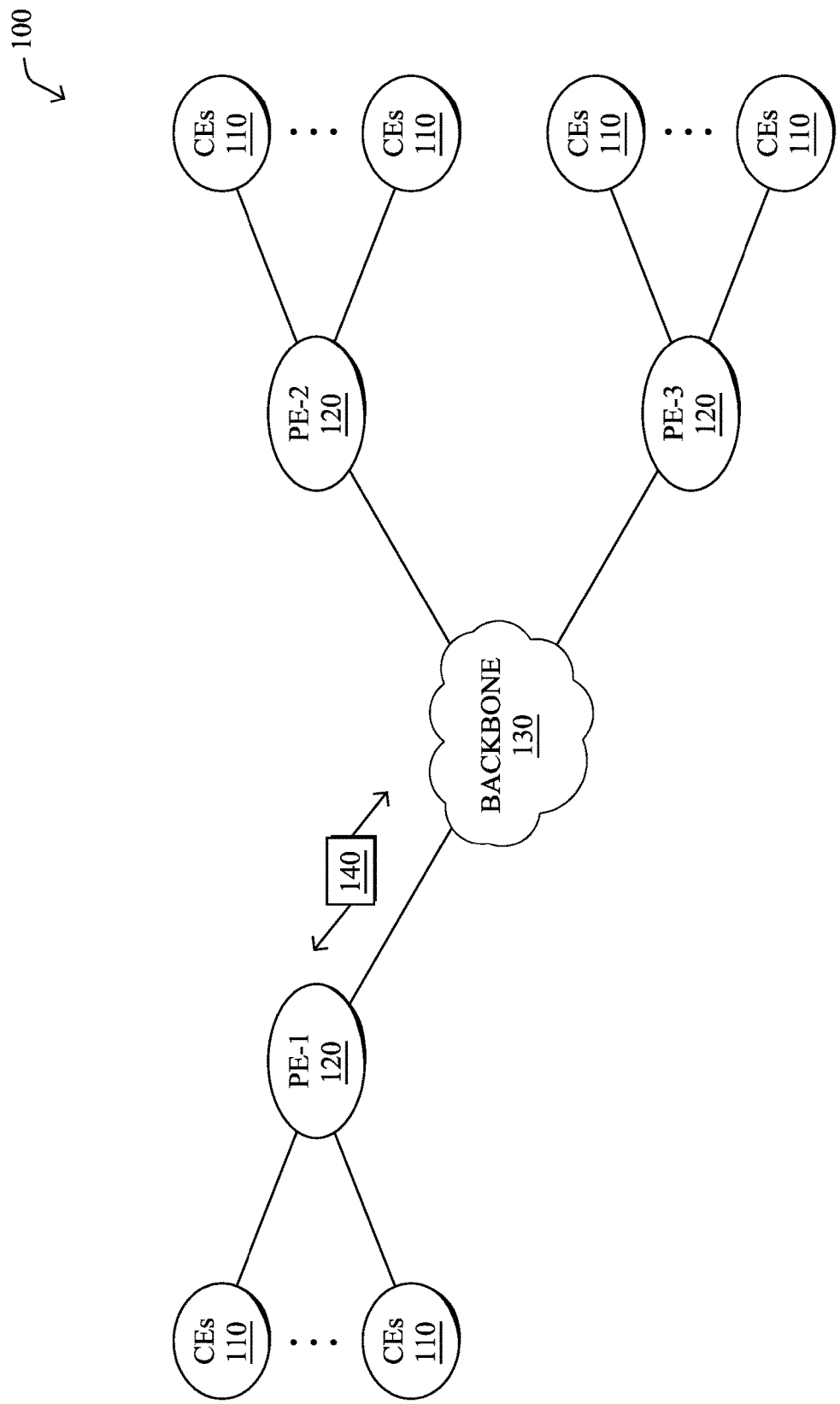
FIGS. 1A-1B illustrate an example communication network.

According to one or more embodiments of the disclosure, a service classifies a device in a network as human-controlled or self-controlled. The service also classifies an online resource as designed for access by human-controlled devices or by self-controlled devices. The service obtains traffic data regarding an attempt by the device to access the online resource via the network. The service determines that the attempt by the device to access the online resource is a security violation, based on the classifications of the device and the online resource. The service initiates a mitigation action in the network for the security violation.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
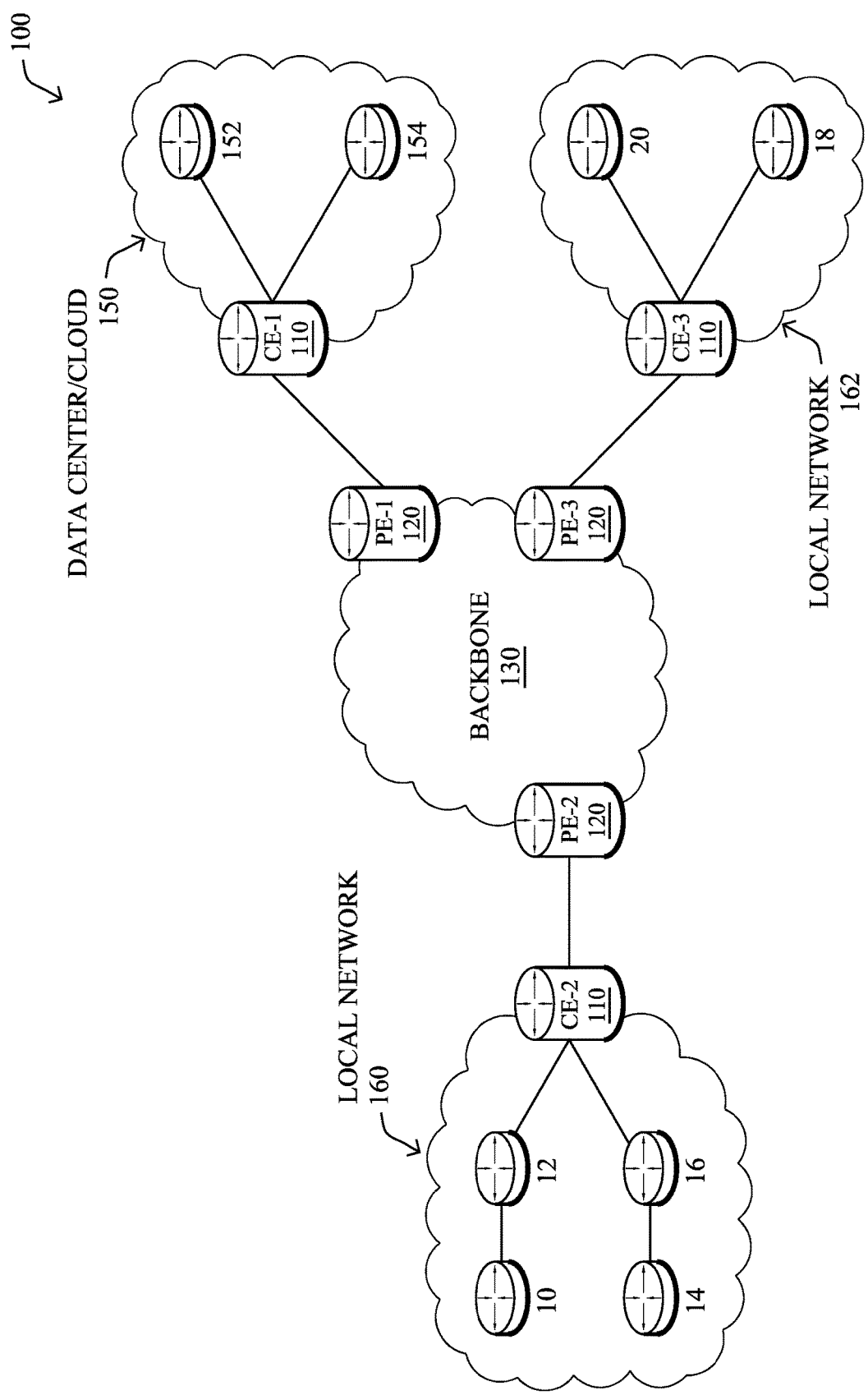

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
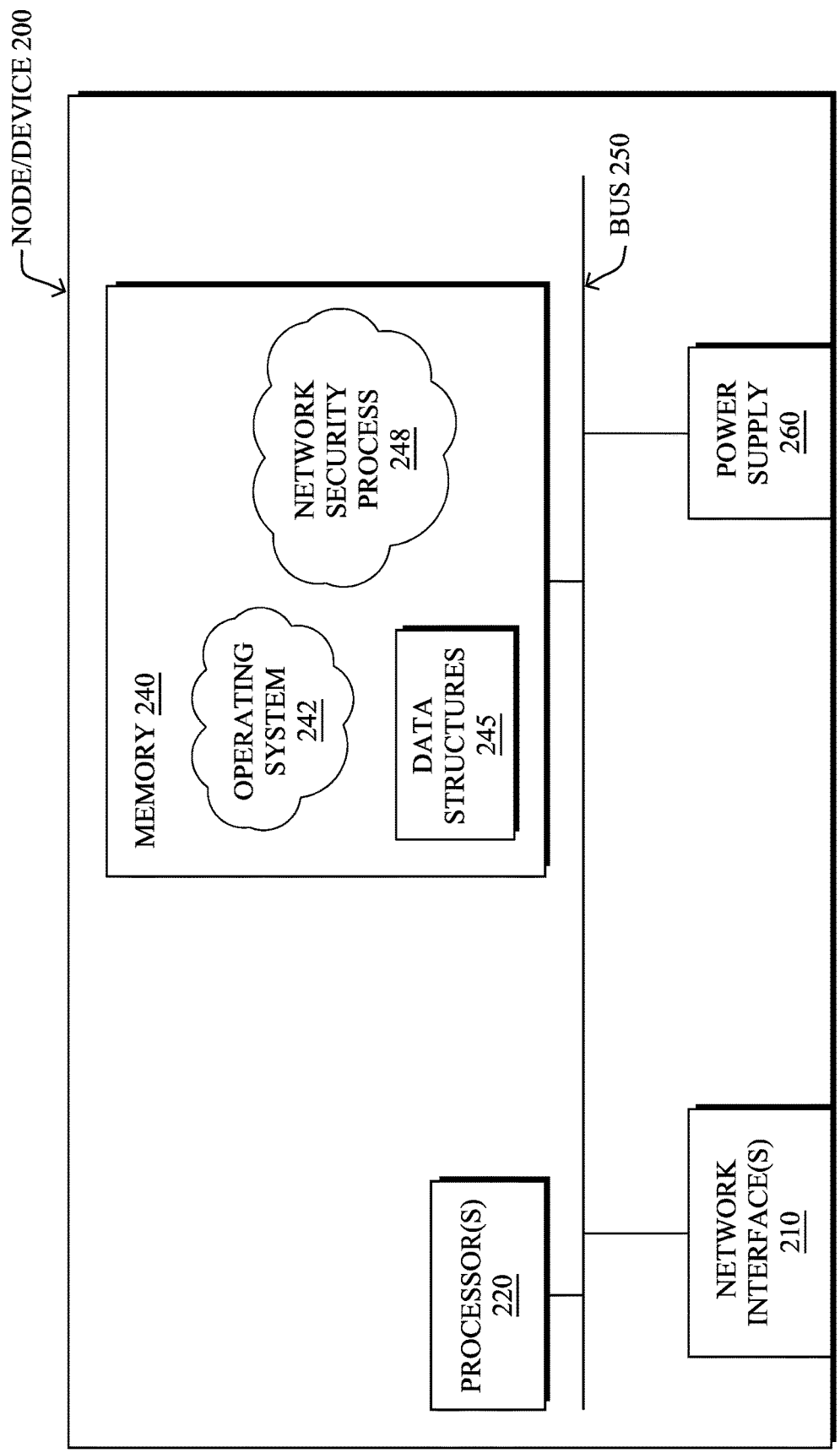
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may a network security process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some embodiments, network security process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used. Network security process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a node having computed behavioral model(s) may raise an anomaly when detecting a significant behavior change. Note that in such as case, although an anomaly may be raised, a learning system for network security is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. Network security process 248 may advantageously identify these forms of misconfigurations, in order to be detected and fixed.

In various embodiments, network security process 248 may utilize machine learning techniques, to perform anomaly detection in the network and/or detect other security violations. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions, based on current or prior network measurements, and may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, security process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
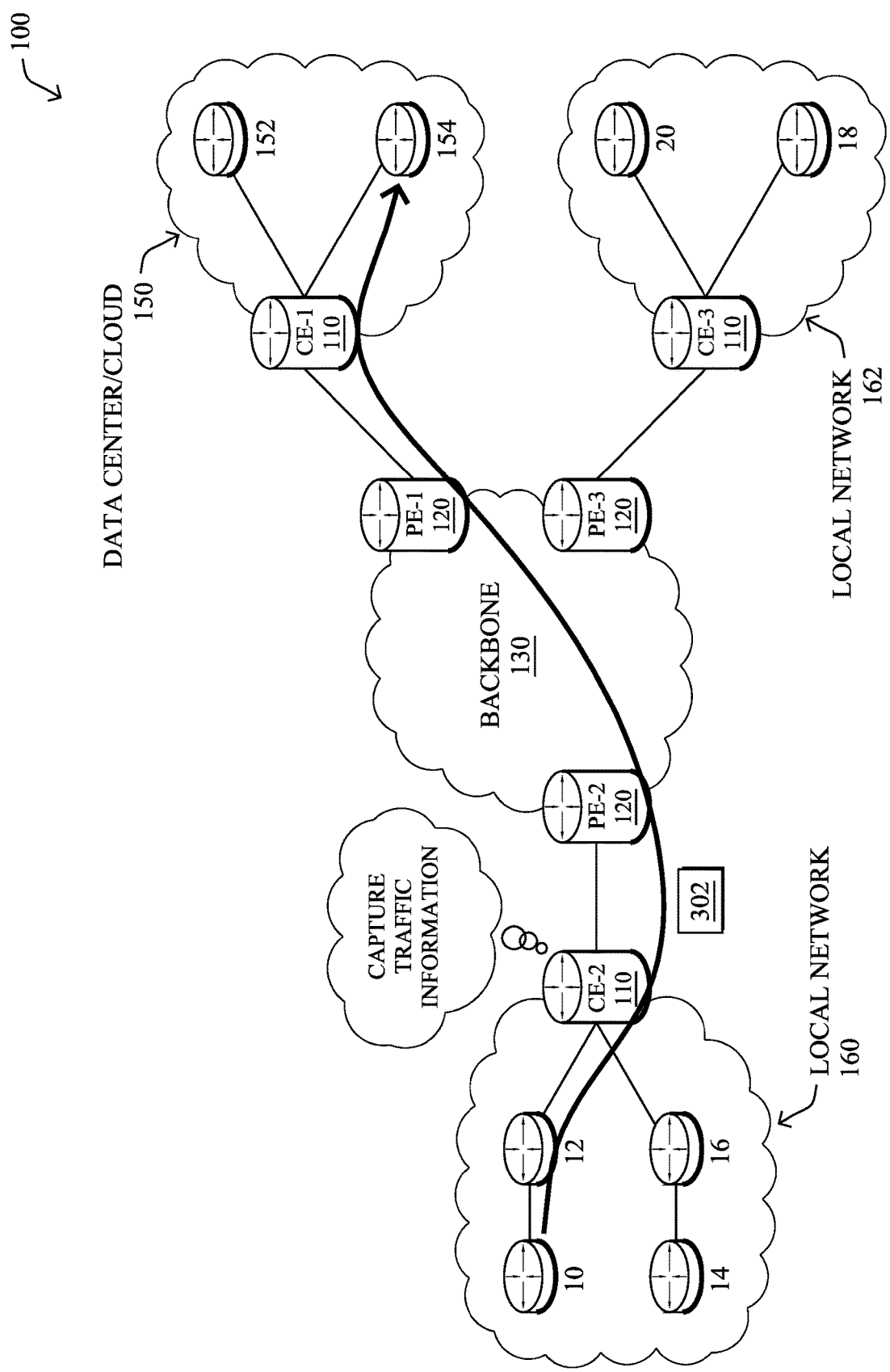
FIG. 3 illustrates an example of a network device detecting a security violation.

An example of a device detecting a network security violation is shown in FIG. 3, according to various embodiments. Generally, network devices may be configured to operate as part of an infrastructure to detect, analyze, and/or mitigate network anomalies, such as network attacks or other security violations (e.g., by executing security process 248). Such an infrastructure may include certain network devices acting as learning agents and one or more supervisory/centralized devices acting as a supervisory and control agent over the distributed agents. The distributed learning agent may be operable to monitor network conditions (e.g., router states, traffic flows, etc.), perform anomaly detection or other security assessments on the monitored data using one or more machine learning models, report detected anomalies to the supervisor, and/or perform local mitigation actions. Similarly, the supervisory device may be operable to coordinate the deployment and configuration of the distributed agents (e.g., by downloading software upgrades to a device, etc.), receive information from the agents (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks before the network or service becomes unavailable. For example, some machine learning approaches may analyze changes in the overall statistical behavior of the network traffic (e.g., the traffic distribution among flows flattens when a DDoS attack based on a number of microflows happens). Other approaches may attempt to statistically characterize the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as distributed learning agents and server 152 may be configured as a supervisory device, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a distributed agent (e.g., routers, switches, servers, blades, firewalls, etc.) or as a supervisory device.

Assume, for purposes of illustration, that CE-2 monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous and/or violates a particular security rule. The monitored traffic flows may be incoming, outgoing, or internal to a local network serviced by a learning agent, in various cases.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flow records, deep packet inspection, etc., may allow detection of an anomaly such as a horizontal movement (e.g. propagation of a malware, etc.), or an attempt to perform information exfiltration.

As noted above, the IoT represents an evolution of computer networks that extends networking capabilities to everyday "things" such as thermostats, appliances, media players, lighting, and the like. With this comes a plethora of increased security risks. For example, nodes/devices in the network can be hacked and used as a jumping off point to launch attacks against the rest of the network or exfiltrate data from servers and sources to which they should not be connecting in the first place. These compromised devices are hard to detect, and it is hard to write security policies that can detect and block this malicious behavior.

One observation that can be made regarding device traffic is that self-controlled devices (e.g., devices that operate autonomously, like a refrigerator) should not be accessing online resources intended for human consumption. For example, the refrigerator in a company's break room should never attempt to log into the company's human resource (HR) website. A good network security policy assesses multiple dimensions. As detailed below, the techniques herein introduce yet another set of security considerations that are based on how devices are controlled and whether online resources are accessed by self-controlled devices or human-controlled devices.

Network Security Indicator of Compromise Based on Human Control Classifications

The techniques herein introduce techniques to detect network security violations based on the control classification of a device and the online resource to which the device is attempting to access. In some aspects, a machine learning-based classifier, such as a recurrent neural network (RNN), can be trained to determine whether a given device is self-controlled or human-controlled. In further aspects, a second machine learning-based classifier can be trained to classify an online resource as typically accessed by human-controlled or self-controlled devices. Combining these classifications allows for a security service to make a security assessment to be made on an access attempt by a network device and, if the attempted access is a security violation, initiate a mitigation action.

Specifically, according to one or more embodiments of the disclosure as described in detail below, a service classifies a device in a network as human-controlled or self-controlled. The service also classifies an online resource as designed for access by human-controlled devices or by self-controlled devices. The service obtains traffic data regarding an attempt by the device to access the online resource via the network. The service determines that the attempt by the device to access the online resource is a security violation, based on the classifications of the device and the online resource. The service initiates a mitigation action in the network for the security violation.

Illustratively, the techniques described herein may be performed by hardware, software, and/or firmware, such as in accordance with the security process 248, which may include computer executable instructions executed by the processor 220 (or independent processor of interfaces 210) to perform functions relating to the techniques described herein.

Operationally, the techniques herein introduce a new security framework that can be used for network policy control and compromise detection, particularly for IoT devices.

Figure 4:
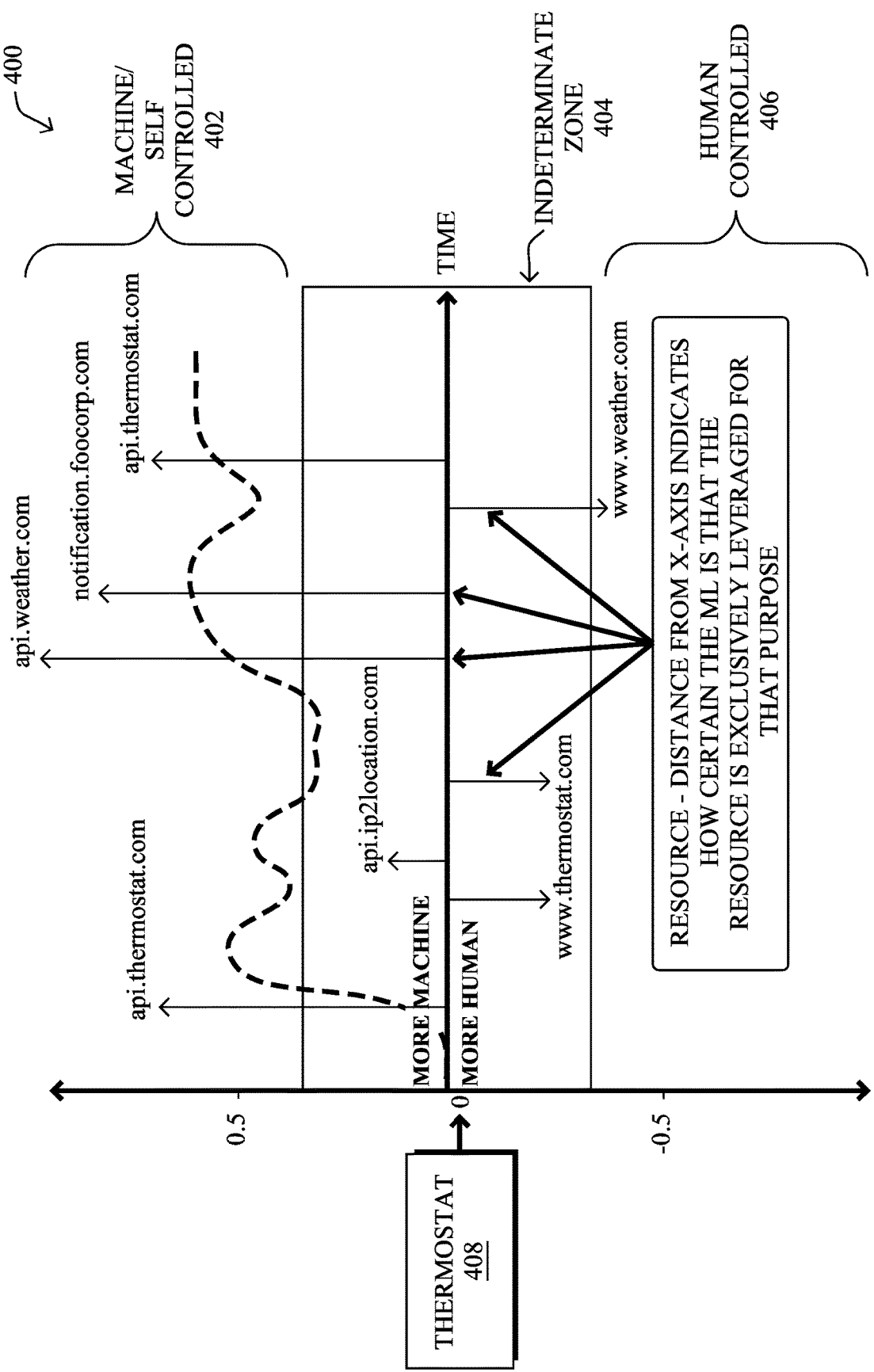
FIG. 4 illustrates an example of the classification of a device as human-controlled or self-controlled.

FIG. 4 illustrates an example 400 of the classification of a device as human-controlled or self-controlled, according to various embodiments. In various embodiments, a network security service may include a machine learning-based classifier that has been trained to classify a given device, such as device 408, as having one of the following classification labels:

Human-controlled—The node/device activates and interacts with other systems usually only when a human is directly controlling it, and accesses resources meant for human consumption. For example, a smart watch with a web browser could be used by a human to access the company's HR department website to check their available vacation days.

Self-controlled—The node/device activates and interacts with other systems autonomously (e.g., without a human trigger) and accesses resources meant for machines. For example, a home's backup battery system may periodically report its charge level to the cloud via a web application program interface (API).

The device classifier may be trained in any number of ways. In one embodiment, training data for the classifier may comprise a set of different device types that have been labeled based on sensed proximities of users to the device types. For example, if a given thermostat sends a request to access api.thermostat.com when there are no sensed humans within proximity of the thermostat (e.g., based on motion sensors, an interface of the thermostat, etc.), this request can be labeled as "self-controlled." From this, a training dataset can be formed and the classifier may classify device 408 based on its device type.

In further embodiments, the device classifier may be trained using a history of online resources that are accessed over time. For example, in one embodiment, the device classifier may be an RNN trained using a set of online resources, as identified by their uniform resource indicators (URIs), that have been labeled as being accessed by self-controlled devices or by human-controlled devices. Once trained, if a device constantly accesses resources designed for machine use, the device classifier may classify the device as self-controlled. Conversely, if the device constantly accesses resources designed for human consumption, the device classifier may classify the device as human-controlled.

In some cases, the device classifier may simply make a binary classification of a device and be trained using binary labels (e.g., "self-controlled" or "human-controlled"). However, in further cases, a given label may also have a confidence metric associated with the label. For example, a given device may be ranked on a scale of [−1, 1], or any other suitable numeric range, to represent the degree to which the device conforms to the label. In one embodiment, there may also be an indeterminate zone within the range of the confidence metric, to signify a weak label association or that the association is too close to be considered reliable. For example, as shown, online resources with confidence metrics within the range of [0.25, 1] may fall within the machine/self-controlled region 402, resources with confidence metrics within the range of (0.25, −0.25) may fall within an indeterminate zone 404, and resources with confidence metrics within the range of [−0.25, −1] may fall within human-controlled region 406.

During operation, assume that a node/device 408 (e.g., a network-connected thermostat), accesses (or attempts to access) a plurality of different online resources over time. For example, device 408 may access api.thermostat.com at a first point in time, www.thermostat.com at a second point in time, api.ip2location.com at a third point in time, api.weather.com at a fourth point in time, notification.foocorp.com at a fifth point in time, www.weather.com at a sixth point in time, and api.thermostat.com at a seventh point in time. Each of these online resources may be labeled with a corresponding confidence metric, to represent how strongly the resource is associated with a given label. For example, the resource of notification.foocorp.com and api.thermostat.com may fall solidly within the machine/self-controlled region 402. Conversely, the resource of www.weather.com may fall within the human-controlled region, and www.thermostat.com may fall within the indeterminate zone 404.

By assessing a history of the access attempts by device 408 to access various online resources over time, the device classifier may label device 408 as self-controlled or human-controlled. Notably, as shown, device 408 may access more online resources that are associated with self-controlled devices than resources that are either in indeterminate zone 404 or human-controlled zone 406. In such a case, the classifier may also associate a confidence metric to device 408 that quantifies how associated device 408 is with the self-controlled label (e.g., 0.6 on the scale shown).

Figure 5:
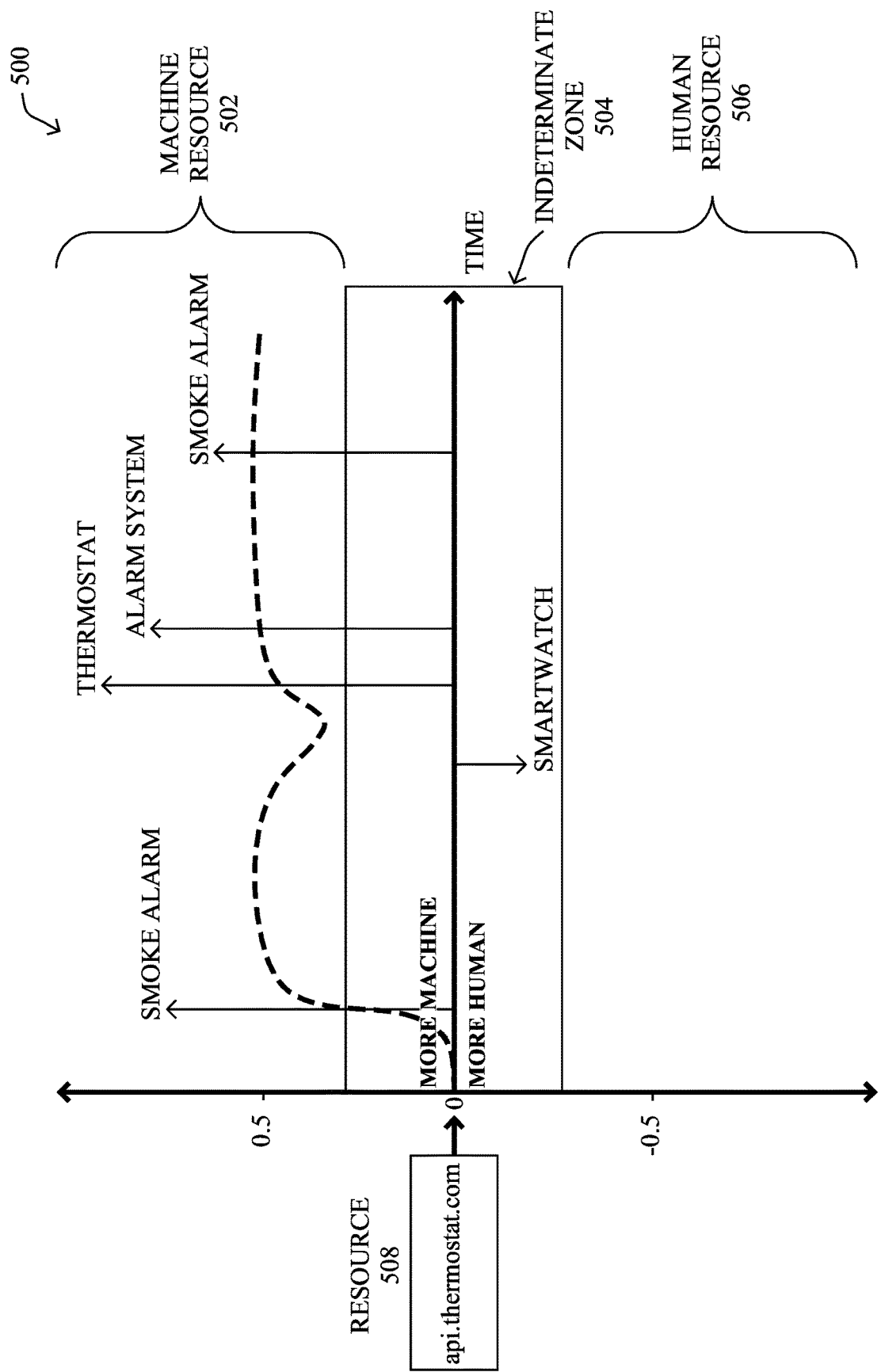
FIG. 5 illustrates an example of the classification of an online resource as accessed by human-controlled or self-controlled devices.

FIG. 5 illustrates an example 500 of the classification of an online resource as accessed by human-controlled or self-controlled devices, according to various embodiments. Similar to the example in FIG. 4, the security service may also include a machine learning-based classifier that is configured to classify a given online resource as either accessed by self-controlled devices or human-controlled devices. Notably, the resource classifier may classify a resource as either one of the following, based on the devices that have attempted to access the resource:

The resource is meant for humans—The resource is primarily meant for access by humans (e.g., the resource has an HTML interface that a human would view in their browser, etc.). For example, the company's HR department has an internal website where employees can view their employment records using a web browser on their own PCs.

The resource is meant for machines—The resource is primarily meant for access by machines (e.g., the resource offers an API or other programmatic interfaces). For example, a company may have a Netflow record collector on a server to which their networking devices can send Netflow records.

Similar to the device classifier, the resource classifier may use unstructured learning to assign one of the above labels to a given online resource, based on the devices that access the resource. Notably, resources running presentation layer protocols that are rendered for human eyes are typically for humans, whereas programmatic interfaces like APIs are generally meant for machine interactions. The classifications may also be strictly binary or, alternatively, be associated with a confidence measure. For example, resources that have confidence metrics within the range of [0.25, 1] may fall within region 502 associated with machine/self-controlled devices. Similarly, resources with confidence metrics within the range of (0.25, −0.25) may fall within an indeterminate zone 504 and resources with confidence metrics within the range of [−0.25, −1] may fall within human-controlled region 506.

Training of the online resource classifier may entail training an RNN or other model using a training dataset of device types that have been labeled as human-controlled or self-controlled. Of course, a verifiable ground truth in the training dataset will always lead to more precise classifications. For example, if it is known from sensor data that a device accessing a resource is human-controlled or self-controlled, such a resource may be labeled accordingly with an appropriate confidence measure.

By way of example, assume that an online resource 508 (e.g., the URI of api.thermostat.com) is to be classified by the resource classifier. Over time, a smoke alarm, a smartwatch, a thermostat, an alarm system, and another smoke alarm may have requested access to resource 508. Now, assume that the training dataset for the resource classifier indicates that smartwatches tend to be human-controlled, while the other devices tend to be machine/self-controlled. Since the overwhelming majority of access attempts to resource 508 were by self-controlled devices, the resource classifier may classify resource 508 as associated with self-controlled devices, accordingly, and potentially with a confidence measure, as well.

In various embodiments, the device classifier and online resource classifier of the security service may work in conjunction with one another, to learn the joint behaviors of the network devices and online resources. For example, an output of the device classifier can be used as input to the resource classifier, and vice-versa, allowing for continuous learning and improvement. In some embodiments, reinforcement learning can also be leveraged to improve the classifiers. For example, details regarding the classification outputs can be provided to an expert that can then decide whether or not the classification was correct.

Figure 6:
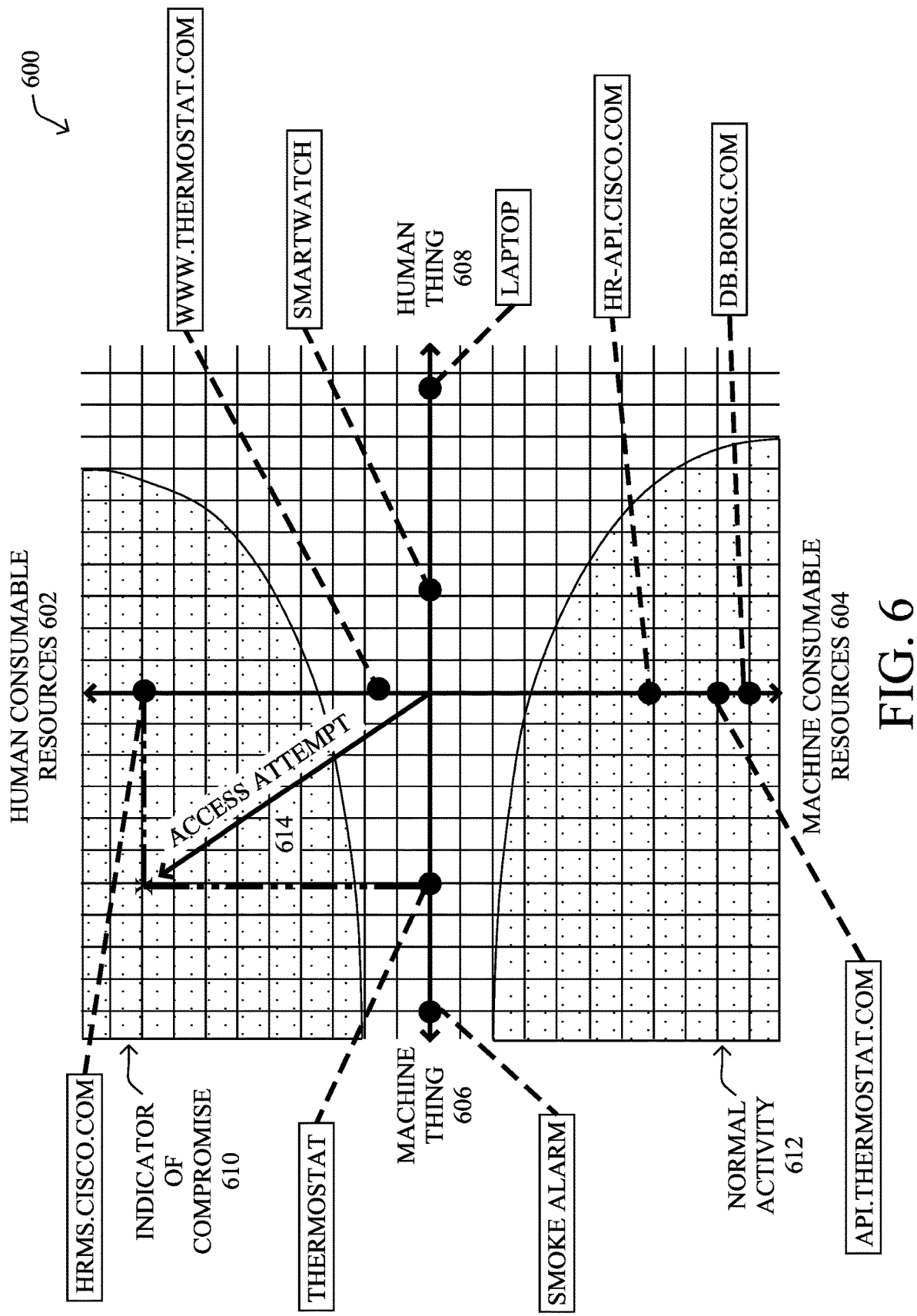
FIG. 6 illustrates an example calculation of an indicator of compromise.

FIG. 6 illustrates an example calculation of an indicator of compromise, according to various embodiments. Generally, the security service may use the device and online resource classifications, to determine whether an attempt by the device to access the online resource is a security violation.

In one embodiment, as shown, the service may represent the device and service classifications as coordinates/points in x-y graph 600. For example, the device classifications may be assigned points along the x-axis, ranging from machine/self-controlled devices 606 to human-controlled devices 608. Similarly, the resources may be plotted along the y-axis, ranging from human consumable resources 602 to resources 604 that are accessed by self-controlled machines. The areas inside the half-hyperbolae shown represent either indicators of compromise 610 or normal activity 612. A vector from the origin can then be used to represent a given attempt by a device to access a particular resource. The magnitude/length of such a vector can be used to then quantify the indicator of compromise. Any such indicator that exceeds a defined security threshold can indicate that the access attempt is a security violation. In further embodiments, the indicator of compromise may be used with other factors to make the security assessment (e.g., the protocols in use, the packet sizes of the traffic, etc.).

Figure 7A:
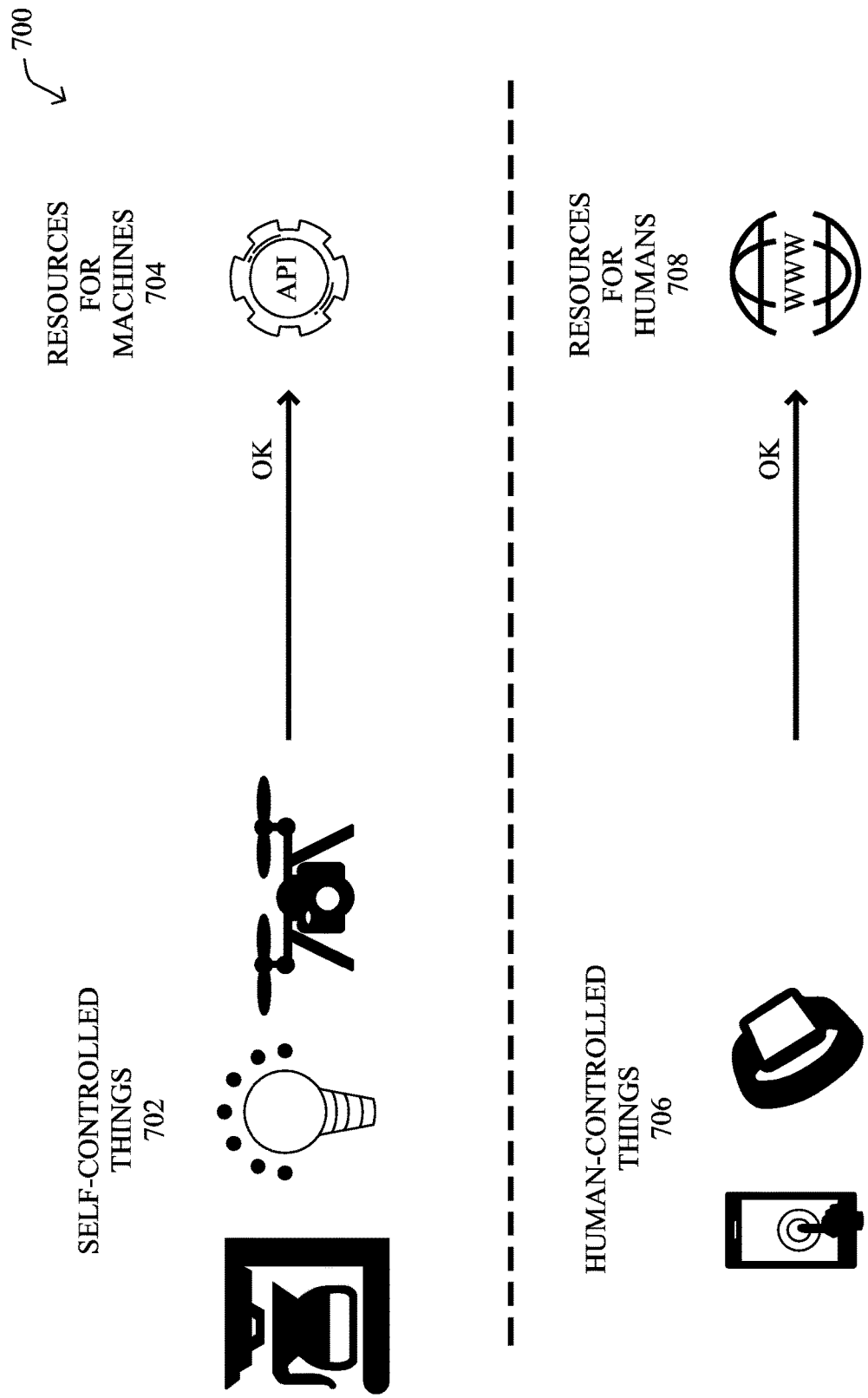
FIGS. 7A-7B illustrate simplified examples of security determinations in a network.
Figure 7B:
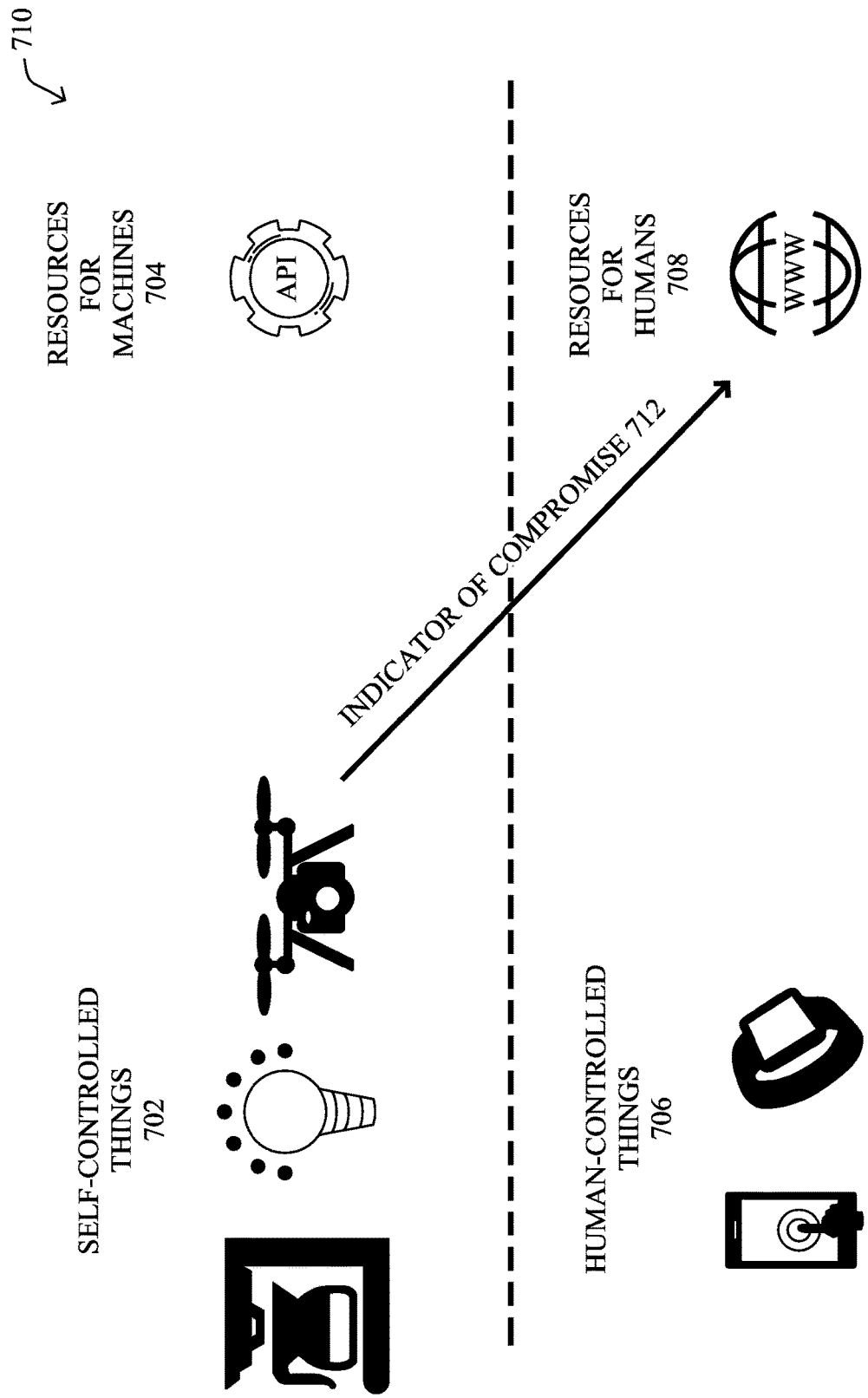

FIGS. 7A-7B illustrate very simplified examples of security determinations in a network, in accordance with the techniques herein. In example 700 in FIG. 7A, examples are shown of access attempts that would not typically be flagged as security violations. More specifically, access attempts by self-controlled devices/things 702 to resources 704 that are typically associated with machine consumption may be considered non-violations. Similarly, access attempts by human-controlled devices/things 706 to resources 708 that are typically associated with human consumption may also be considered non-violations.

FIG. 7B illustrates a simplified example 710 of a potential security violation that can be flagged by the security service. Assume, for example, that a self-controlled device 702 suddenly attempts to access resource 708 (e.g., a refrigerator attempt to access an HR payroll website). In such a case, this access attempt may represent a security violation and a corresponding indicator of compromise 712 may be assessed by the security service to detect such a violation.

When the security service detects a security violation, it may initiate any number of mitigation actions. For example, the service may cause the traffic between the offending device and the online resource to be blocked, traffic associated with the device to be redirected (e.g., for a deeper security assessment), and/or the service may send an alert regarding the security violation to a user interface. The selected mitigation action can also be a function of the strength of the indicator of compromise, in some embodiments. For example, if the device is weakly classified as self-controlled and the service is weakly classified as associated with self-controlled devices, the service may simply send an alert. However, if these classifications are both strong, the indicator of compromise may be much larger, requiring an immediate blocking of traffic associated with the device.

Figure 8:
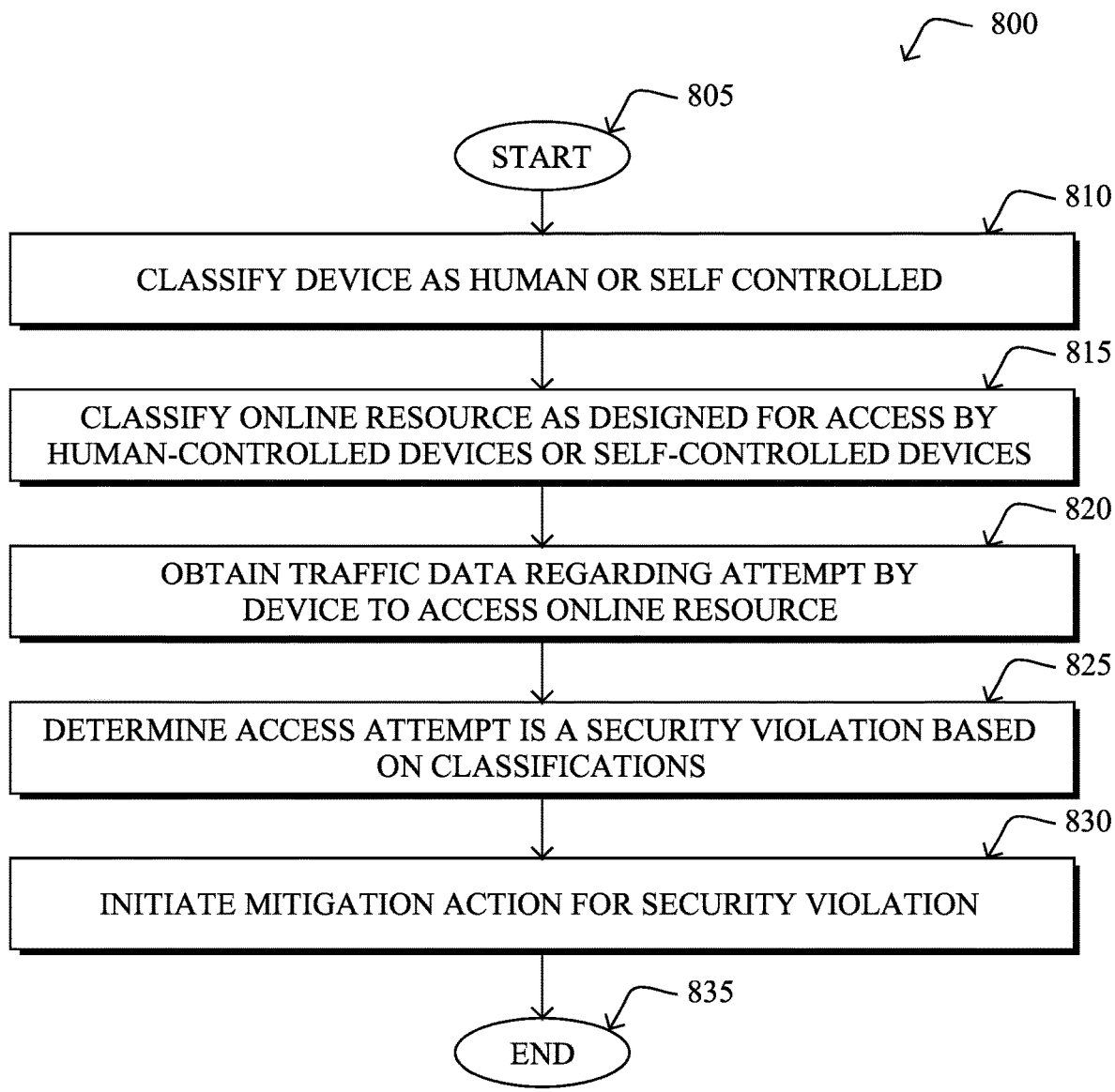
FIG. 8 illustrates an example simplified procedure for making a security determination based on device and online resource classifications.

FIG. 8 illustrates an example simplified procedure for making a security determination based on device and online resource classifications, in accordance with one or more embodiments described herein. For example, a non-generic, specifically configured device (e.g., device 200) may perform procedure 800 by executing stored instructions (e.g., process 248) to provide a security service to a network. The procedure 800 may start at step 805, and continues to step 810, where, as described in greater detail above, the service may classify a device in a network as human-controlled or self-controlled. In some embodiments, the service may use a machine learning-based device classifier, such as an RNN, to classify the device the either human-controlled or self-controlled. For example, in some cases, the classifier may assess a history of the online resources to which the device attempted access, to make the classification. In further cases, the classifier may assess the device type of the device. For example, in some embodiments, devices may be labeled based on sensed proximities of users to the devices. Such labeling can be used as part of the training dataset for the classifier. The classification may also be strictly binary or non-binary (e.g., on a scale that denotes the strength of the classification).

At step 815, as detailed above, the service classifies an online resource as designed for access by human-controlled devices or by self-controlled devices. In various embodiments, the online resource may be represented by a URI and may be classified using a machine learning-based classifier (e.g., an RNN, etc.). Such a classifier may be trained using a training dataset indicative of attempts to access the service by various devices that have been labeled as human-controlled or self-controlled (e.g., based on the resources that they attempt to access, based on their device types, based on sensed proximities, etc.). In further embodiments, the URI itself can be used as part of the classification. For example, a URI beginning with "api." may be associated with self-controlled devices, whereas a URI beginning with "www. may be associated with human-controlled devices.

At step 820, the service may obtain traffic data regarding an attempt by the device to access the online resource via the network, as described in greater detail above. Such traffic data may generally identify the device (e.g., the IP and/or MAC address of the device, etc.) and the online resource (e.g., the URI of the resource, the IP address of the resource, etc.). Other example data that may be captured can include information regarding the protocol(s) in use (e.g., HTTP, TLS, etc.), timestamp information for the attempt, and/or any other information regarding the access attempt.

At step 825, as detailed above, the service may determine that the attempt by the device to access the online resource is a security violation, based on the classifications of the device and the online resource. In cases in which the device and resource classifications are strictly binary, a security violation may entail a human-controlled device attempting to access a service associated with self-controlled devices or vice-versa. In further cases in which the classifications are on a sliding scale, the device may represent the classifications as a point in space (e.g., an x-y plot, etc.) and determine whether a vector length from a reference point in the space exceeds a threshold. In some embodiments, the assessment of the device and resource classifications may be used as one of a plurality of considerations in making the security decision.

At step 830, the service may initiate a mitigation action in the network for the security violation, as described in greater detail above. In various embodiments, the mitigation action may include blocking traffic between the device and the online resource, redirecting traffic associated with the device, sending an alert regarding the security violation to a user interface, or taking any other mitigation action. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an index of compromise that is based on device and resource classifications. Notably, the techniques herein can be used to ensure that self-controlled devices are not accessing online resources that are intended for human consumption, which may be indicative of malicious activity. Conversely, if a human-controlled device is accessing an online resource intended for self-controlled devices, this could also be an indication of malicious activity.

While there have been shown and described illustrative embodiments that provide for a network security index of compromise based on human control classifications, it is to be understood that various other adaptations and modifications may be made within the spirit and scope of the embodiments herein. For example, while certain embodiments are described herein with respect to using certain models for purposes of classification, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
generating, by a service, a classification of a device in a network using a machine learning-based device classifier trained to classify a given device as human-controlled or self-controlled, wherein the classification of the device indicates whether the device is human-controlled or self-controlled;
generating, by the service, a classification of an online resource using a machine learning-based resource classifier trained to classify a given online resource as designed for access by human-controlled devices or designed for access by self-controlled devices, wherein the online resource is represented by a uniform resource indicator (URI), and wherein the classification of the online resource indicates whether the online resource is designed for access by human-controlled devices or designed for access by self-controlled devices;
obtaining, by the service, traffic data regarding an attempt by the device to access the online resource via the network;
determining, by the service, that the attempt by the device to access the online resource is a security violation, based on the classifications of the device and the online resource; and
initiating, by the service, a mitigation action in the network for the security violation.

2. The method as in claim 1, wherein the mitigation action comprises one of: blocking traffic between the device and the online resource, redirecting traffic associated with the device, or sending an alert regarding the security violation to a user interface.

3. The method as in claim 1, wherein classifying the device as human-controlled or self-controlled comprises:
using the machine learning-based device classifier to classify the device based on a history of online resources accessed by the device.

4. The method as in claim 3, wherein classifying the online resource as designed for access by human-controlled devices or by self-controlled devices comprises:
using the machine learning-based resource classifier to classify the online resource based on a history of device types that have accessed the online resource.

5. The method as in claim 4, wherein the machine learning-based device classifier or the machine learning-based resource classifier comprises a recurrent neural network (RNN).

6. The method as in claim 3, wherein the machine learning-based device classifier is trained using training data regarding a plurality of device types and labeled based on sensed proximities of users to the device types.

7. The method as in claim 1, wherein the classifications of the device and the online resource are non-binary classifications.

8. The method as in claim 1, wherein determining that the device attempting to access the online resource is a security violation, based on the classifications of the device and the online resource, comprises:
representing the classifications of the device and the online resource as a first point in space; and
determining that a vector length from a reference point in the space to the first point exceeds a defined threshold.

9. An apparatus, comprising:
one or more network interfaces to communicate with a network;
a processor coupled to the network interfaces and configured to execute one or more processes; and a memory configured to store a process executable by the processor, the process when executed configured to:
  generate a classification of a device in a network using a machine learning-based device classifier trained to classify a given device as human-controlled or self-controlled, wherein the classification of the device indicates whether the device is human-controlled or self-controlled;
  generate a classification of an online resource using a machine learning-based resource classifier trained to classify a given online resource as designed for access by human-controlled devices or designed for access by self-controlled devices, wherein the online resource is represented by a uniform resource indicator (URI), and wherein the classification of the online resource indicates whether the online resource is designed for access by human-controlled devices or designed for access by self-controlled devices;
  obtain traffic data regarding an attempt by the device to access the online resource via the network;
  determine that the attempt by the device to access the online resource is a security violation, based on the classifications of the device and the online resource; and
  initiate a mitigation action in the network for the security violation.

10. The apparatus as in claim 9, wherein the mitigation action comprises one of:
  blocking traffic between the device and the online resource, redirecting traffic associated with the device, or sending an alert regarding the security violation to a user interface.

11. The apparatus as in claim 9, wherein the apparatus classifies the device as human-controlled or self-controlled by:
  using the machine learning-based device classifier to classify the device based on a history of online resources accessed by the device.

12. The apparatus as in claim 11, wherein the apparatus classifies the online resource as designed for access by human-controlled devices or by self-controlled devices by:
  using the machine learning-based resource classifier to classify the online resource based on a history of device types that have accessed the online resource.

13. The apparatus as in claim 12, wherein the machine learning-based device classifier or the machine learning-based resource classifier comprises a recurrent neural network (RNN).

14. The apparatus as in claim 11, wherein the machine learning-based device classifier is trained using training data regarding a plurality of device types and labeled based on sensed proximities of users to the device types.

15. The apparatus as in claim 9, wherein the classifications of the device and the online resource are non-binary classifications.

16. The apparatus as in claim 9, wherein the apparatus determines that the device attempting to access the online resource is a security violation, based on the classifications of the device and the online resource, by:
  representing the classifications of the device and the online resource as a first point in space; and
  determining that a vector length from a reference point in the space to the first point exceeds a defined threshold.

17. A tangible, non-transitory, computer-readable medium storing program instructions that cause a service to execute a process comprising:
  generating, by a service, a classification of a device in a network using a machine learning-based device classifier trained to classify a given device as human-controlled or self-controlled, wherein the classification of the device indicates whether the device is human-controlled or self-controlled;
  generating, by the service, a classification of an online resource using a machine learning-based resource classifier trained to classify a given online resource as designed for access by human-controlled devices or designed for access by self-controlled devices, wherein the online resource is represented by a uniform resource indicator (URI), and wherein the classification of the online resource indicates whether the online resource is designed for access by human-controlled devices or designed for access by self-controlled devices;
  obtaining, by the service, traffic data regarding an attempt by the device to access the online resource via the network;
  determining, by the service, that the attempt by the device to access the online resource is a security violation, based on the classifications of the device and the online resource; and
  initiating, by the service, a mitigation action in the network for the security violation.

18. The computer-readable medium as in claim 17, wherein the mitigation action comprises one of: blocking traffic between the device and the online resource, redirecting traffic associated with the device, or sending an alert regarding the security violation to a user interface.

* * * * *